US009697640B2

(12) United States Patent
Obert et al.

(10) Patent No.: US 9,697,640 B2
(45) Date of Patent: *Jul. 4, 2017

(54) START NODE DETERMINATION FOR TREE TRAVERSAL IN RAY TRACING APPLICATIONS

(71) Applicant: QUALCOMM Incorporated, San Diego, CA (US)

(72) Inventors: Juraj Obert, Orlando, FL (US); Vineet Goel, La Jolla, CA (US); Ouns Mouri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 503 days.

This patent is subject to a terminal disclaimer.

(21) Appl. No.: 14/257,385

(22) Filed: Apr. 21, 2014

(65) Prior Publication Data

US 2015/0302629 A1    Oct. 22, 2015

(51) Int. Cl.
*G06T 15/06* (2011.01)
*G06K 9/00* (2006.01)

(52) U.S. Cl.
CPC .......... *G06T 15/06* (2013.01); *G06T 2210/12* (2013.01)

(58) Field of Classification Search
CPC . G06T 9/40; G06T 11/40; G06T 15/00; G06T 15/005; G06T 15/06; G06T 15/40; G06T 17/005
USPC ......................................................... 345/426
See application file for complete search history.

(56) References Cited

U.S. PATENT DOCUMENTS

| 7,002,571 | B2* | 2/2006 | Lake ...................... G06T 17/005 345/420 |
| 7,340,711 | B2 | 3/2008 | Hetzel et al. |
| 8,212,816 | B1 | 7/2012 | Hoberock et al. |
| 8,253,730 | B1 | 8/2012 | Carr |
| 8,502,819 | B1 | 8/2013 | Aila |

(Continued)

FOREIGN PATENT DOCUMENTS

| EP | 2950275 A1 | 12/2015 |
| WO | 2008012199 A2 | 1/2008 |

OTHER PUBLICATIONS

Reshetov, Alexander, Alexei Soupikov, and Jim Hurley. "Multi-level ray tracing algorithm." ACM Transactions on Graphics (TOG) 24.3 (2005): 1176-1185.*

(Continued)

*Primary Examiner* — Ulka Chauhan
*Assistant Examiner* — Sae Won Yoon
(74) *Attorney, Agent, or Firm* — Shumaker & Sieffert, P.A.

(57) ABSTRACT

At least one processor may organize a plurality of primitives in a hierarchical data structure. The at least one processor may rasterize a plurality of bounding volumes associated with non-root nodes of the hierarchical data structure to an off-screen render target. The at least one processor may determine a bounding volume that is intersected by a ray out of the plurality of bounding volumes. The at least one processor may determine a non-root node of the hierarchical data structure that is associated with the bounding volume as a start node in the hierarchical data structure to start traversal of the hierarchical data structure. The at least one processor may traverse the hierarchical data structure starting from the start node to determine the primitive that is intersected by the ray.

21 Claims, 6 Drawing Sheets

(56) References Cited

U.S. PATENT DOCUMENTS

| | | | |
|---|---|---|---|
| 8,638,331 | B1 | 1/2014 | Jarosz et al. |
| 8,717,357 | B2 | 5/2014 | McCombe et al. |
| 8,791,945 | B2 | 7/2014 | Clarberg et al. |
| 9,424,685 | B2* | 8/2016 | Howson ............... G06T 15/80 |
| 2005/0243346 | A1* | 11/2005 | Foehr .................... G06F 3/122 |
| | | | 358/1.9 |
| 2006/0256112 | A1* | 11/2006 | Heirich ................. G06T 15/00 |
| | | | 345/427 |
| 2008/0024489 | A1 | 1/2008 | Shearer |
| 2008/0259075 | A1 | 10/2008 | Fowler et al. |
| 2009/0189898 | A1 | 7/2009 | Dammertz et al. |
| 2009/0256845 | A1* | 10/2009 | Sevastianov ........... G06T 15/40 |
| | | | 345/426 |
| 2009/0262132 | A1 | 10/2009 | Peterson et al. |
| 2010/0053162 | A1* | 3/2010 | Dammertz ............. G06T 15/06 |
| | | | 345/426 |
| 2010/0079455 | A1* | 4/2010 | Wei ...................... A61B 5/02007 |
| | | | 345/424 |
| 2010/0079457 | A1* | 4/2010 | Tavenrath .............. G06T 15/06 |
| | | | 345/426 |
| 2010/0289799 | A1 | 11/2010 | Hanika et al. |
| 2011/0316855 | A1 | 12/2011 | Mejdrich et al. |
| 2012/0182300 | A1 | 7/2012 | Salvi et al. |
| 2012/0293515 | A1 | 11/2012 | Clarberg et al. |
| 2013/0207967 | A1 | 8/2013 | Park et al. |
| 2013/0215436 | A1* | 8/2013 | Genda ................. G06K 15/1869 |
| | | | 358/1.2 |
| 2014/0285488 | A1* | 9/2014 | Sevastiyanov .......... G06T 15/06 |
| | | | 345/426 |
| 2015/0193968 | A1* | 7/2015 | Barringer .............. G06T 15/005 |
| | | | 345/420 |

OTHER PUBLICATIONS

International Preliminary Report on Patentability from International Application No. PCT/US2015/026406, dated Jul. 8, 2016, 9 pp.

International Search Report and Written Opinion from International Application No. PCT/US2015/026406, dated Aug. 13, 2015, 13 pp.

Wald et al., "State of the Art in Ray Tracing Animated Scenes," Eurographics Technical Report Series, Sep. 2007, XP007908773, pp. 89-116.

Knoll et al., "Interactive Isosurface Ray Tracing of Large Octree Volumes," IEEE Symposium on Interactive Ray Tracing, Sep. 18-20, 2006, 9 pp.

Response to Written Opinion dated Aug. 13, 2015, from International Application No. PCT/US2015/026406, filed on Feb. 18, 2016, 3 pp.

Second Written Opinion from International Application No. PCT/US2015/026406, dated Apr. 13, 2016, 7 pp.

Response to Second Written Opinion dated Apr. 13, 2016, from International Application No. PCT/US2015/026406, filed on Jun. 2, 2016, 5 pp.

Bak, "Real Time Ray Tracing," Master thesis, IMM, DTU, Project No. 38, Jun. 2010, 105 Pages.

Hurley et al., "Fast Ray Tracing for Modern General Purpose CPU," International Conference Graphicon, 2002, 8 pp.

* cited by examiner

START NODE DETERMINATION FOR TREE TRAVERSAL IN RAY TRACING APPLICATIONS

TECHNICAL FIELD

This disclosure relates to graphics processing, including traversing a hierarchical data structure to determine a ray-primitive intersection for ray tracing.

BACKGROUND

In computer graphics, ray tracing is the process of tracing three-dimensional (3D) rays through a 3D scene and finding ray-primitive intersections. In order to accelerate the process of finding ray-primitive intersections, a scene geometry is arranged in an acceleration data structure (ADS) that hierarchically groups scene primitives (e.g., triangles). The ADS may be recursively traversed by performing ray intersection tests on the hierarchy of scene primitives to determine the primitives of the scene that are intersected by the ray.

SUMMARY

Instead of traversing the ADS from the root node, a graphics processing unit (GPU) may instead start traversal of the ADS from an interior node, thereby reducing the number of ray intersection tests that the GPU may perform on the hierarchy. The GPU may determine an interior node of the ADS from which to start traversal by rasterizing a subset of bounding volumes associated with the interior nodes of the hierarchical data structure to an off-screen render target. The GPU may determine, from a color value sampled from the off-screen render target, the node index of an interior node that is intersected by the ray, and may start traversal of the ADS from that node, thereby reducing the number of ray intersection tests a GPU may perform to traverse the ADS.

In one example of the disclosure, a method may include organizing, by at least one processor, a plurality of primitives in a hierarchical data structure. The method may further include rasterizing, by the at least one processor, a plurality of bounding volumes associated with non-root nodes of the hierarchical data structure to an off-screen render target. The method may further include determining, by the at least one processor and based on rasterizing the plurality of bounding volumes to the off-screen render target, a non-root node of the hierarchical data structure as a start node in the hierarchical data structure to start traversal of the hierarchical data structure. The method may further include traversing, by the at least one processor, the hierarchical data structure starting from the start node to determine the primitive that is intersected by a ray.

In another example of the disclosure, an apparatus for graphics processing may include a memory and at least one processor configured to: organize a plurality of primitives in a hierarchical data structure; rasterize a plurality of bounding volumes associated with non-root nodes of the hierarchical data structure to an off-screen render target; determine, based on rasterizing the plurality of bounding volumes to the off-screen render target, a non-root node of the hierarchical data structure as a start node in the hierarchical data structure to start traversal of the hierarchical data structure; and traverse the hierarchical data structure starting from the start node to determine the primitive that is intersected by a ray.

In another example of the disclosure, an apparatus for graphics processing may include means for organizing a plurality of primitives in a hierarchical data structure. The apparatus may further include means for rasterizing a plurality of bounding volumes associated with nodes of the hierarchical data structure to an off-screen render target. The apparatus may further include means for determining, based on rasterizing the plurality of bounding volumes to the off-screen render target, a non-root node of the hierarchical data structure as a start node in the hierarchical data structure to start traversal of the hierarchical data structure. The apparatus may further include means for traversing the hierarchical data structure starting from the start node to determine the primitive that is intersected the ray.

In another example of the disclosure, a computer-readable storage medium may store instructions that, when executed, cause one or more programmable processors to: organize, by at least one processor, a plurality of primitives in a hierarchical data structure; rasterize, by the at least one processor, a plurality of bounding volumes associated with non-root nodes of the hierarchical data structure to an off-screen render target; determine, by the at least one processor and based on rasterizing the plurality of bounding volumes to the off-screen render target, a non-root node of the hierarchical data structure as a start node in the hierarchical data structure to start traversal of the hierarchical data structure; and traverse, by the at least one processor, the hierarchical data structure starting from the start node to determine the primitive that is intersected by a ray.

The details of one or more examples are set forth in the accompanying drawings and the description below. Other features, objects, and advantages will be apparent from the description and drawings, and from the claims.

DETAILED DESCRIPTION

In general, this disclosure describes techniques for determining a primitive that is intersected by a ray for ray tracing purposes by starting traversal of a hierarchical data structure of scene primitives from an interior node of the hierarchical data structure. When traversing a hierarchical data structure, such as an acceleration data structure (ADS), on a graphical processing unit (GPU), starting traversal of the hierarchical data structure from the root node may yield suboptimal performance because such traversal may require the GPU to perform extraneous ray intersection tests on the scene primitives in the hierarchical data structure.

Instead of traversing the hierarchical data structure from the root node, the GPU may instead start traversal of the hierarchical data structure from a node other than the root node, thereby reducing the number of ray intersection tests that the GPU may perform. The GPU may determine a non-root node of the hierarchical data structure from which to start traversal by utilizing shader units from its graphics processing pipeline to rasterize a subset of the bounding volumes associated with interior nodes and leaf nodes of the hierarchical data structure to an off-screen render target. The GPU may determine, from the off-screen render target, interior non-root node from which to start traversal of the hierarchical data structure, thereby reducing the number of ray intersection tests a GPU may perform to traverse the hierarchical data structure. Because rasterizing to an off-screen render target is relatively less computationally expensive than performing ray intersection tests, the GPU may realize a substantial increase in ray tracing performance compared with traversing the hierarchical data structure from the root node.

In accordance with aspects of the present disclosure, the GPU may be configured to organize a plurality of primitives in a hierarchical data structure. The GPU may be further configured to rasterize a plurality of bounding volumes associated with non-root nodes of the hierarchical data structure to an off-screen render target. The GPU may be further configured to determine a bounding volume that is intersected by a ray out of the plurality of bounding volumes. The GPU may be further configured to determine a non-root node of the hierarchical data structure that is associated with the bounding volume as a start node in the hierarchical data structure to start traversal of the hierarchical data structure. The GPU may be further configured to traverse the hierarchical data structure starting from the start node to determine the primitive that is intersected by the ray.

Figure 1:
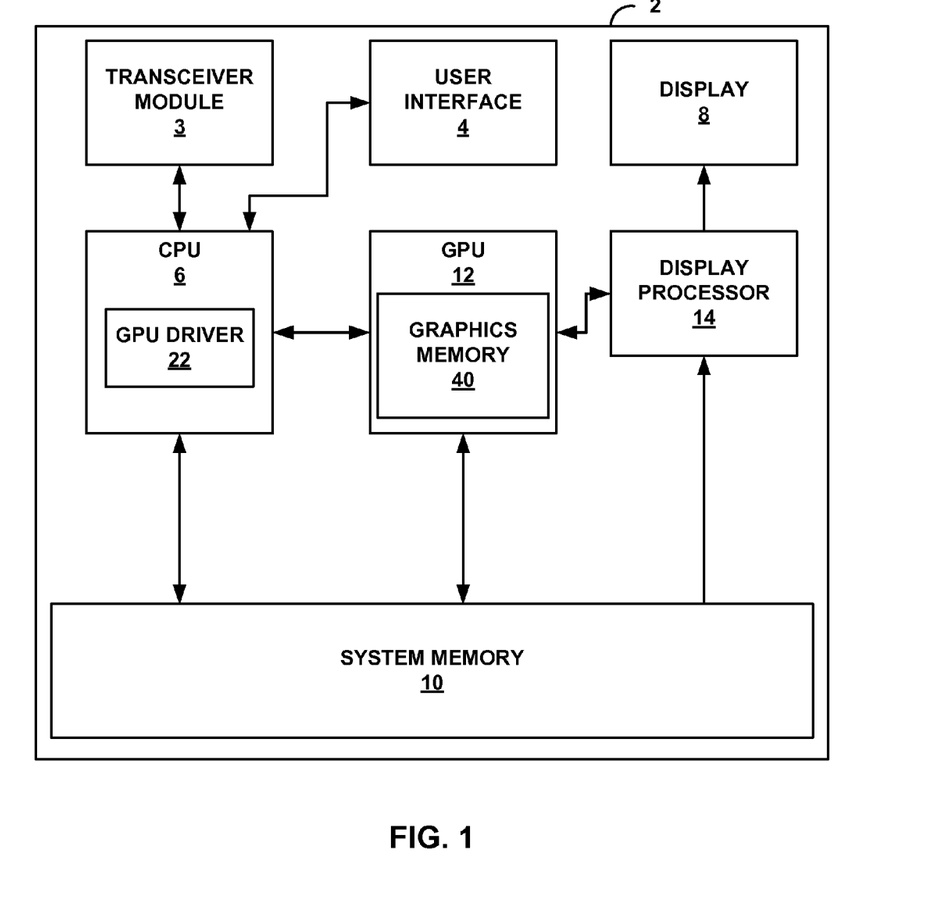
FIG. 1 is a block diagram illustrating an example computing device that may be configured to implement one or more aspects of this disclosure.

FIG. 1 is a block diagram illustrating an example computing device that may be configured to implement one or more aspects of this disclosure. As shown in FIG. 1, device 2 may be a computing device including but not limited to video devices, media players, set-top boxes, wireless handsets such as mobile telephones and so-called smartphones, personal digital assistants (PDAs), desktop computers, laptop computers, gaming consoles, video conferencing units, tablet computing devices, and the like. In the example of FIG. 1, device 2 may include central processing unit (CPU) 6, system memory 10, and GPU 12. Device 2 may also include display processor 14, transceiver module 3, user interface 4, and display 8. Transceiver module 3 and display processor 14 may both be part of the same integrated circuit (IC) as CPU 6 and/or GPU 12, may both be external to the IC or ICs that include CPU 6 and/or GPU 12, or may be formed in the IC that is external to the IC that includes CPU 6 and/or GPU 12.

Device 2 may include additional modules or units not shown in FIG. 1 for purposes of clarity. For example, device 2 may include a speaker and a microphone, neither of which are shown in FIG. 1, to effectuate telephonic communications in examples where device 2 is a mobile wireless telephone, or a speaker where device 2 is a media player. Device 2 may also include a video camera. Furthermore, the various modules and units shown in device 2 may not be necessary in every example of device 2. For example, user interface 4 and display 8 may be external to device 2 in examples where device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display 8. Transceiver module 3 may include circuitry to allow wireless or wired communication between device 2 and another device or a network. Transceiver module 3 may include modulators, demodulators, amplifiers and other such circuitry for wired or wireless communication.

CPU 6 may be a microprocessor, such as a central processing unit (CPU) configured to process instructions of a computer program for execution. CPU 6 may comprise a general-purpose or a special-purpose processor that controls operation of device 2. A user may provide input to device 2 to cause CPU 6 to execute one or more software applications. The software applications that execute on CPU 6 may include, for example, an operating system, a word processor application, an email application, a spreadsheet application, a media player application, a video game application, a graphical user interface application or another program. Additionally, CPU 6 may execute GPU driver 22 for controlling the operation of GPU 12. The user may provide input to device 2 via one or more input devices (not shown) such as a keyboard, a mouse, a microphone, a touch pad or another input device that is coupled to device 2 via user interface 4.

The software applications that execute on CPU 6 may include one or more graphics rendering instructions that instruct CPU 6 to cause the rendering of graphics data to display 8. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

GPU 12 may be configured to perform graphics operations to render one or more graphics primitives to display 8. Thus, when one of the software applications executing on CPU 6 requires graphics processing, CPU 6 may provide graphics commands and graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 8 more quickly than drawing the scenes directly to display 8 using CPU 6.

GPU 12 may, in some instances, be integrated into a motherboard of device 2. In other instances, GPU 12 may be present on a graphics card that is installed in a port in the motherboard of device 2 or may be otherwise incorporated within a peripheral device configured to interoperate with device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores, so that GPU 12 may be referred to as a multi-core processor.

GPU 12 may be directly coupled to graphics memory 40. Thus, GPU 12 may read data from and write data to graphics memory 40 without using a bus. In other words, GPU 12 may process data locally using a local storage, instead of off-chip memory. Such graphics memory 40 may be referred to as on-chip memory. This allows GPU 12 to operate in a more efficient manner by eliminating the need of GPU 12 to read and write data via a bus, which may experience heavy bus traffic. In some instances, however, GPU 12 may not include a separate memory, but instead utilize system memory 10 via a bus. Graphics memory 40 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and output values that cause the pixels of display 8 to illuminate to display the image. Display 8 may be the display of device 2 that displays the image content generated by GPU 12. Display 8 may be a liquid crystal display (LCD), an organic light emitting diode display (OLED), a cathode ray tube (CRT) display, a plasma display, or another type of display device.

In accordance with aspects of the present disclosure, GPU 12 may organize a plurality of primitives in a hierarchical data structure. GPU 12 may rasterize one or more bounding volumes associated with nodes of the hierarchical data structure to an off-screen render target. GPU 12 may determine interior non-root node of the hierarchical data structure as a start node in the hierarchical data structure to start traversal of the hierarchical data structure. GPU 12 may traverse the hierarchical data structure starting from the start node to determine the primitive that is intersected by the ray.

Figure 2:
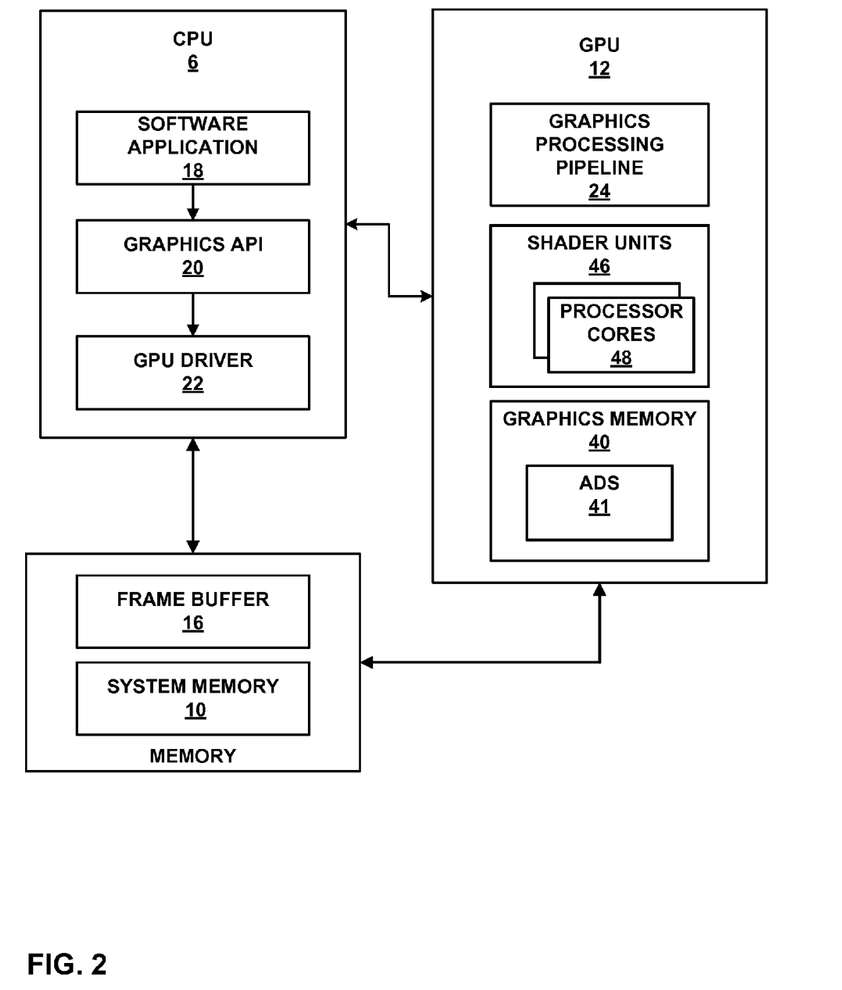
FIG. 2 is a block diagram illustrating example implementations of the CPU, the GPU, and the system memory of FIG. 1 in further detail.

FIG. 2 is a block diagram illustrating example implementations of CPU 6, GPU 12, and system memory 10 of FIG. 1 in further detail. As shown in FIG. 2, CPU 6 may include at least one software application 18, graphics API 20, and GPU driver 22, each of which may be one or more software applications or services that execute on CPU 6.

Memory available to CPU 6 and GPU 12 may include system memory 10 and frame buffer 16. Frame buffer 16 may be a part of system memory 10 or may be separate from system memory 10. Frame buffer 16 may store rendered image data.

Software application 18 may be any application that utilizes the functionality of GPU 12. For example, software application 18 may be a GUI application, an operating system, a portable mapping application, a computer-aided design program for engineering or artistic applications, a video game application, or another type of software application that uses 2D or 3D graphics.

Software application 18 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 18 may invoke GPU driver 22, via graphics API 20, to issue one or more commands to GPU 12 for rendering one or more graphics primitives into displayable graphics images. For example, software application 18 may invoke GPU driver 22, via graphics API 20, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 18 to GPU driver 22, GPU driver 22 may formulate one or more commands that specify one or more operations for GPU 12 to perform in order to render the primitive. When GPU 12 receives a command from CPU 6, graphics processing pipeline 24 decodes the command and configures graphics processing pipeline 24 to perform the operation specified in the command. For example, input-assembler 26 in graphics processing pipeline 24 may read primitive data and assemble the data into primitives for use by the other graphics pipeline stages in graphics processing pipeline 24. After performing the specified operations, graphics processing pipeline 24 outputs the rendered data to frame buffer 16 associated with a display device.

Frame buffer 16 stores destination pixels for GPU 12. Each destination pixel may be associated with a unique screen pixel location. In some examples, frame buffer 16 may store color components and a destination alpha value for each destination pixel. For example, frame buffer 16 may store Red, Green, Blue, Alpha (RGBA) components for each pixel where the "RGB" components correspond to color values and the "A" component corresponds to a destination alpha value. Although frame buffer 16 and system memory 10 are illustrated as being separate memory units, in other examples, frame buffer 16 may be part of system memory 10.

In some examples, graphics processing pipeline 24 may include one or more of a vertex shader stage, a hull shader stage, a domain shader stage, a geometry shader stage, and a pixel shader stage. These stages of graphics processing pipeline 24 may be considered shader stages. These shader stages may be implemented as one or more shader programs that execute on shader units 46 in GPU 12. Shader units 46 may be configured as a programmable pipeline of processing components. In some examples, shader unit 46 may be referred to as "shader processors" or "unified shaders," and may perform geometry, vertex, pixel, or other shading operations to render graphics. Shader units 46 may include processor cores 48, each of which may include one or more components for fetching and decoding operations, one or more arithmetic logic units for carrying out arithmetic calculations, one or more memories, caches, and registers.

GPU 12 may designate shader units 46 to perform a variety of shading operations such as vertex shading, hull shading, domain shading, geometry shading, pixel shading, and the like by sending commands to shader units 46 to execute one or more of a vertex shader stage, a hull shader stage, a domain shader stage, a geometry shader stage, and a pixel shader stage in graphics processing pipeline 24. In some examples, GPU driver 22 may be configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of shader units 46 within GPU 12. For example, the shader programs may include vertex shader programs that may be executed by shader units 46 to perform the functions of a vertex shader stage, hull shader programs that may be executed by shader units 46 to perform the functions of a hull shader stage, domain shader programs that may be executed by shader units 46 to perform the functions of a domain shader stage, geometry shader programs that may be executed by shader units 46 to perform the functions of a geometry shader stage and/or pixel shader programs that may be executed by shader units 46 to perform the functions of a pixel shader. A vertex shader program may control the execution of a programmable vertex shader unit or a unified shader unit, and include instructions that specify one or more per-vertex operations.

Graphics memory 40 is on-chip storage or memory that physically integrated into the integrated circuit of GPU 12. Because graphics memory 40 is on-chip, GPU 12 may be able to read values from or write values to graphics memory 40 more quickly than reading values from or writing values to system memory 10 via a system bus. Graphics memory 40 may store ADS 41 that hierarchically groups scene primitives (e.g., triangles). In some examples, ADS 41 may be stored in system memory 10, in shader memory (not shown) of shader units 46 or in shared system/graphics memory (not shown).

In accordance with aspects of the present disclosure, GPU 12 may organize a plurality of primitives in ADS 41. GPU 12 may rasterize one or more bounding volumes associated with nodes of ADS 41 to an off-screen render target stored in graphics memory 40. GPU 12 may determine a non-root node of ADS 41 as a start node in ADS 41 to start traversal of ADS 41. GPU 12 may traverse ADS 41 starting from the start node to determine the primitive that is intersected by the ray.

Figure 3:
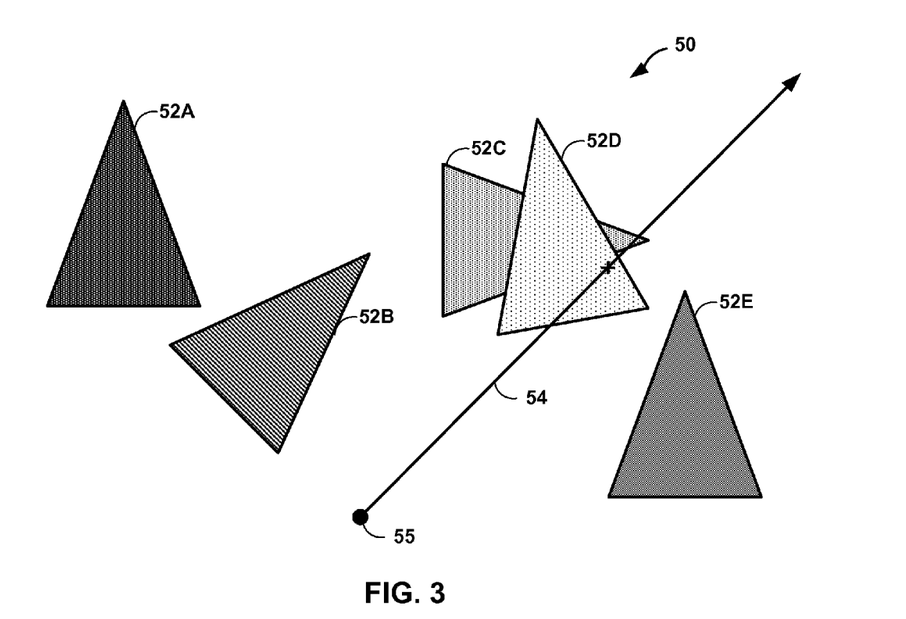
FIG. 3 is a block diagram illustrating an example scene onto which the GPU may perform ray tracing.

FIG. 3 is a block diagram illustrating an example scene onto which GPU 12 may perform ray tracing. As shown in FIG. 3, scene 50 may be a 2D or 3D scene that includes primitives 52A-52E (hereafter "primitives 52"). As part of the ray tracing process, GPU 12 may determine, for ray 54, which may be a 2D or 3D ray, and which emanates from source 55, the primitives in primitives 52 of scene 50 that are intersected by ray 54.

Figure 4:
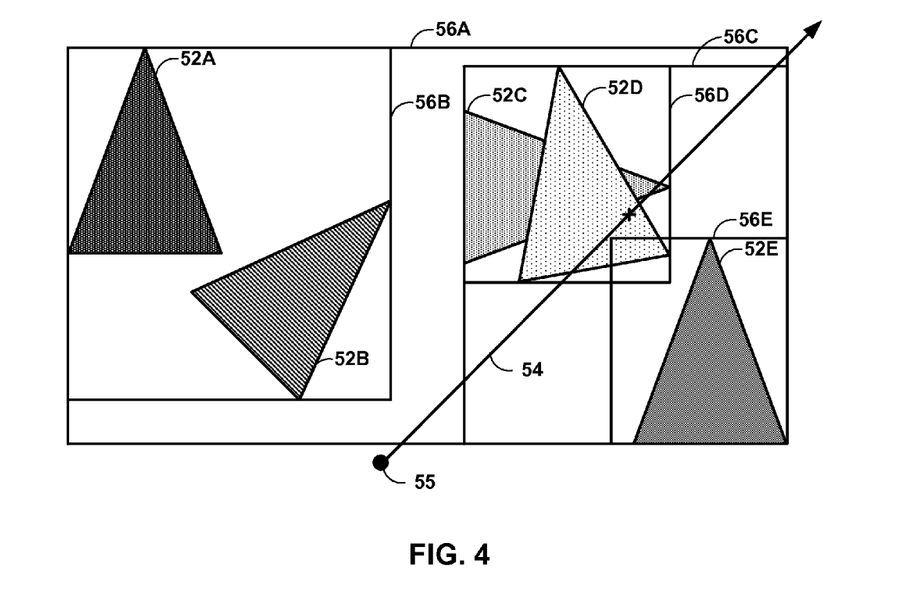
FIG. 4 is a block diagram illustrating partitioning an example scene into bounding volumes.

GPU 12 may systematically determine the primitive in primitives 52 that is intersected by ray 54 by dividing scene 50, hierarchically arranging the divided portions of scene 50, and recursively traversing the hierarchy of the divided portions of scene 50. FIG. 4 is a block diagram illustrating partitioning scene 50 into bounding volumes. As shown in FIG. 4, GPU 12 may conceptually partition primitives 52 into bounding volumes. 56A-56E ("bounding volumes 56"). Bounding volumes 56 may be axis-aligned bounding boxes (AABBs), which may be bounding boxes having a minimized area within which all points of the enclosed primitives may lie. The bounding boxes may be axis-aligned such that the edges of the boxes may be parallel to the coordinate axis (e.g., the x, y, and z axis).

Bounding volume 56A may be a bounding box that bounds all primitives 52 of scene 50. Bounding volumes 56B and 56C may be subsets of bounding volume 56A in that bounding volumes 56B and 56C bound a subset of the portion of scene 50 bound by bounding volume 56A. Bounding volume 56B may bound primitives 52A and 52B, and bounding volume 56C may bound primitives 52C, 52D, and 52E. Bounding volumes 56D and 56E may be subsets of bounding volume 56C, and may bound a subset of the portion of scene 50 bound by bounding volume 56B. Bounding volume 56D may bound primitives 52C and 52D, and bounding volume 56E may bound primitive 52E.

In the example shown in FIG. 4, GPU 12 may partition primitives 52 into five bounding volumes 56. GPU 12 may use more than or fewer than five bounding volumes 56. For example GPU 12 may create additional bounding volumes as subsets of bounding volume 56B to individually bound primitives 52A and 52B, respectively. In some examples, CPU 6 may also be configured to partition primitives 52 into bounding volumes 56.

Figure 5:
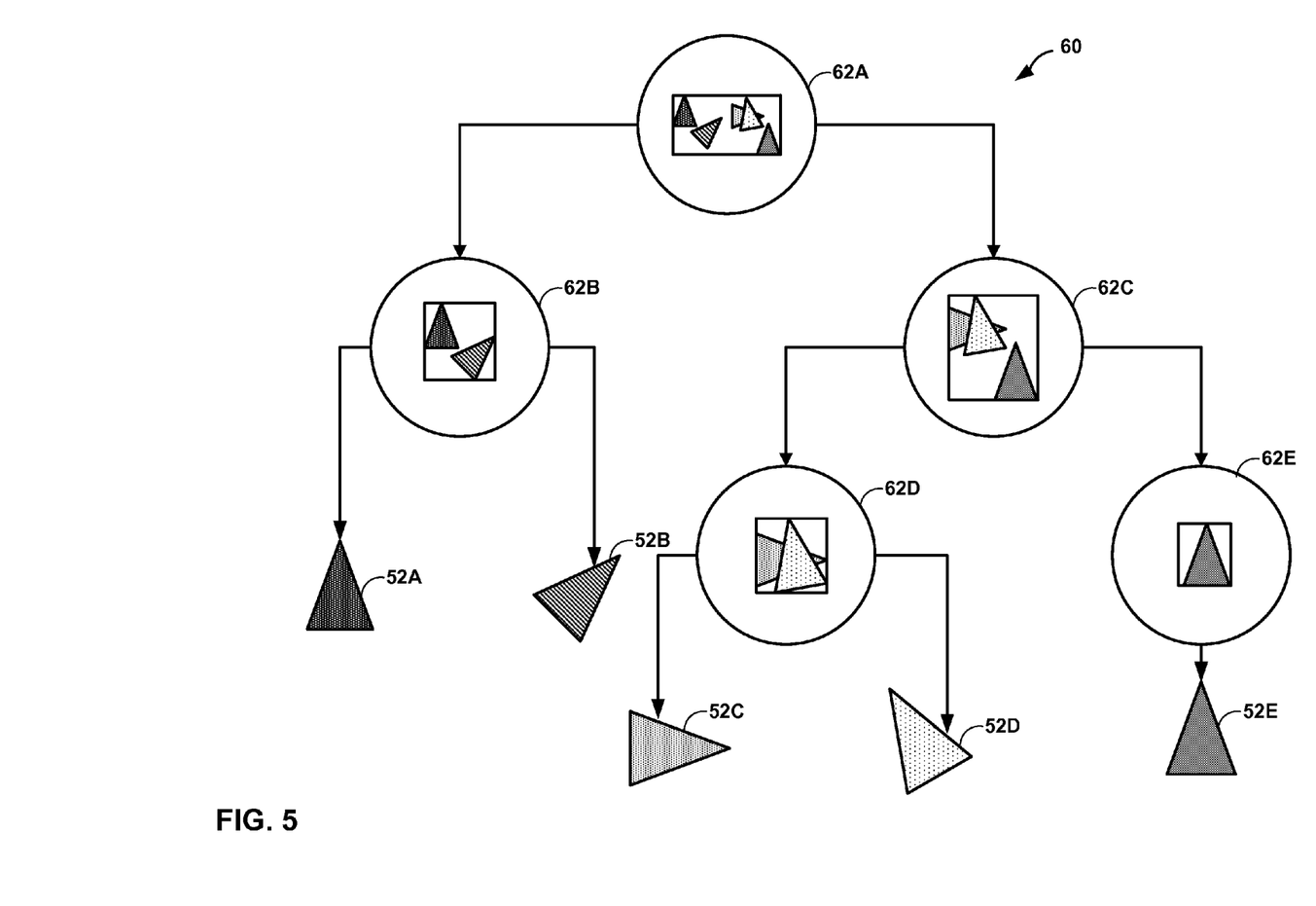
FIG. 5 illustrates an example hierarchical data structure having nodes that are associated with the bounding volumes and the primitives shown in FIG. 4.

FIG. 5 illustrates an example hierarchical data structure having nodes that are associated with the bounding volumes 56 and primitives 52 shown in FIG. 4. As discussed above, scene primitives of a scene may be organized into ADS 41, and ADS 41 may be traversed to determine a ray-primitive intersection. GPU 12 may store ADS 41 in graphics memory 40. As shown in FIG. 5, bounding volumes 56 and primitives 52 may be associated with nodes of ADS 41, such as bounding volume hierarchy (BVH) tree 60, that is associated with scene 50. GPU 12 or CPU 6 may construct BVH tree 60 such that it may include nodes 62A-62E ("nodes 62") that are associated with bounding volumes 56 and primitives 52 in scene 50. More specifically, root node 62A, interior node 62C, and leaf nodes 62B, 62D, and 62E may each be associated with a bounding volume of bounding volumes 56. Nodes of BVH tree 60 other than root node 62A may be referred to as non-root nodes of BVH tree 60. For example, interior node 62C and leaf nodes 62B, 62D, and 62E may be referred to as non-root nodes of BVH tree 60. Leaf nodes 62B, 62D, and 62E may each be linked with at least one primitive of primitives 52. For example, leaf node 62B may be linked with primitives 52A and 52B, leaf node 62D may be linked with primitives 52C and 52D, and leaf node 62E may be linked with primitive 52E. BVH tree 60 may be considered an unbalanced binary tree because each non-leaf node of hierarchical data structure 60 has at most two child nodes, and because leaf nodes 62B, 62D, and 62E may have unequal depths.

Because bounding volume 56A bounds all primitives 52 of scene 50, GPU 12 may associate root node 62A with bounding volume 56A. GPU 12 may associate nodes 62B and 62C, which are child nodes of root node 62A, with bounding volumes 56B and 56C, respectively, because bounding volumes 56B and 56C are each subsets of bounding volume 56A. GPU 12 may link primitives 52A and 52B with node 62B, because bounding volume 56B associated with node 62B bounds primitives 52A and 52B, and because there are no additional bounding volumes that are subsets of bounding volume 56B.

GPU 12 may associate bounding volumes 56D and 56E with nodes 62D and 62E, which are child nodes of node 62C, because bounding volumes 56D and 56E are each subsets of bounding volume 56C associated with node 62C. GPU 12 may link primitives 52C and 52D with node 62D, because bounding volume 56D associated with node 62D bounds primitives 52C and 52D, and because there are no additional bounding volumes that are subsets of bounding volume 56D. GPU 12 may also link primitive 52E with node 62E, because bounding volume 56E associated with node 62E bounds primitive 52E, and because there are no additional bounding volumes that are subsets of bounding volume 56E.

GPU 12 may traverse BVH tree 60 to determine the primitive of primitive 52 that intersects ray 54 by performing ray-box intersection tests for the bounding volumes 56 associated with nodes 62 of BVH tree 60. GPU 12 may start traversal of BVH tree 60 by performing a ray-box intersection test for bounding volume 56A associated with root node 62A. If GPU 12 determines that ray 54 intersects bounded volume 56A, GPU 12 may continue to traverse BVH tree 60 to node 62B, and GPU 12 may perform a ray-box intersection test for bounding volume 56B associated with node 62B. If GPU 12 determines that ray 54 does not intersect bounded volume 56B, GPU 12 may recursively traverse BVH tree up to node 62A and down to node 62C, and GPU 12 may perform a ray-box intersection test for bounding volume 56C associated with node 62C. If GPU 12 determines that ray 54 intersects bounded volume 56C, GPU 12 may continue to traverse BVH tree 60 to node 62D, and GPU 12 may perform a ray-box intersection test for bounding volume 56D associated with node 62D. If GPU determines that ray 54 intersects bounded volume 56D, GPU 12 may perform a ray-primitive intersection tests for primitives linked to node 62D. Therefore, GPU 12 may perform a ray-primitive intersection test for primitive 52C and may also perform a ray-primitive intersection test for primitive 52D. GPU 12 may determine from the ray-primitive intersection test for primitive 52D that ray 54 does intersect primitive 52D. After GPU 12 determines that ray 54 does intersect primitive 52D, GPU 12 may continue to recursively traverse BVH tree 60 up to node 62C and down to 62E, and GPU 12 may perform a ray-box intersection test for bounding volume 56E associated with node 62E. GPU 12 may determine, based on the ray-box intersection test, that ray 54 does not intersect bounding volume 56E, thereby ending traversal of BVH tree 60 for ray 54.

If BVH tree 60 can be traversed starting from a non-root node, such as one of interior node 62C or leaf nodes 62B, 62D, and 62E, GPU 12 may reduce the number of ray intersection tests that it performs relative to starting traversal of BVH tree 60 from root node 62A, thereby increasing the efficiency of determining a primitive that is intersected by a ray. GPU 12 may start traversal of BVH tree 60 from a non-root node of BVH tree 60 by determining that a bounded volume associated with a non-root node of BVH tree 60 is intersected by ray 54. GPU 12 may rasterize at least a subset of bounded volumes 56 to an off-screen render target in graphics memory 40. GPU 12 may determine, based on rasterizing the plurality of bounding volumes 56 to the off-screen render target, a non-root node of BVH tree 60 as a start node in BVH tree 60 to start traversal of BVH tree 60. GPU 12 may traverse BVH tree 60 starting from the start node to determine the primitive that is intersected by ray 54.

Figure 6:
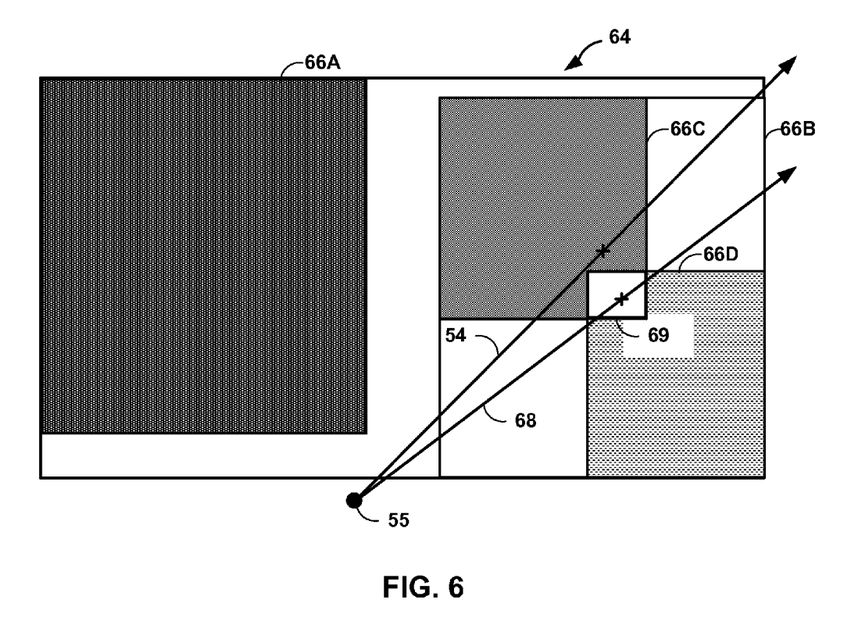
FIG. 6 is a block diagram illustrating an example representation of bounding volumes rasterized to an example off-screen render target.

FIG. 6 is a block diagram illustrating an example representation of bounding volumes rasterized to an example off-screen render target. GPU 12 may, for a specified number of top levels of a BVH tree, use a pixel shader and/or a vertex shader of its graphics pipeline to rasterize a representation of bounding volumes associated with the nodes in the specified top levels of the BVH tree to an off-screen render target in graphics memory 40. For example, given a 16-level BVH tree, GPU 12 may rasterize a representation of bounding volumes associated with the top 5-6 levels of the BVH tree. Thus, GPU 12 may choose to rasterize a representation of bounding volumes associated with fewer than all of the levels of the BVH tree.

As shown in FIG. 6, GPU 12 may render representations 66A-66D ("representations 66") of bounding volumes 56B-56E associated with nodes 62B-62E of BVH tree 60 in render target 64. GPU 12 may store render target 64 in graphics memory 40. GPU 12 may project bounding volumes 56B-56E and shader units 46 of GPU 12 may rasterize representations of bounding volumes 56B-56E associated with the non-root nodes 62B-62E of BVH tree 60 as two-dimensional or three-dimensional representations, such as polygons, cubes, and the like. For example, a hardware rasterizer of GPU 12 may scan-covert each of bounding volumes 56 into pixels in render target 64. In one example, GPU 12 may rasterize representations 66 of bounding volumes 56B-56E as flat shaded cubes. GPU 12 may also rasterize the representations 66 of bounding volumes 56B-56E in differing colors, so that the output color of each of the representations 66 may represent a node index that indicates the associated node in BVH tree 60. GPU 12 may scale and translate each of the representations of the interior nodes to match the shape of the associated bounded volume. In some examples, GPU 12 may rasterize representations 66 of bounding volumes 56B-56E in relatively lower resolution compared to bounded volumes 56B-56E in scene 50. In this way, GPU 12 may further increase its performance in determining ray-primitive intersections.

GPU 12 may determine the output color of the representations 66 by performing standard depth testing of the projected bounding volumes 56B-56E and by assigning different output colors to pixels of representations 66 to represent different depths of the projected bounding volumes 56B-56E. GPU 12 may associate the output colors assigned to the pixels of representations 66 with nodes 62 of BVH tree 60. In this way, GPU 12 may determine a node in BVH tree 60 associated with a pixel in render target 64 by sampling the output color of the pixel. As part of rasterizing representations 66 to render target 64, GPU 12 may determine a mapping of primary rays to pixels in render target 64, so that, for a pixel in render target 64, GPU 12 may map one or more primary rays, such as ray 54, that intersects the pixel. In some examples, render target 64 may have a one-to-one mapping between a pixel and a primary ray. In other examples, if representations 66 are rasterized at a relatively lower resolution (compared to the resolution of corresponding bounding volumes 56) to render target 64, a pixel may be mapped to multiple primary rays. GPU 12 may determine that representation 66C is the representation closest to the source of ray 54 and that includes a pixel mapped to ray 54. GPU 12 may sample the pixel in representation 66C mapped to ray 54 to determine the color of the pixel. GPU 12 may determine that the sampled color of the pixel in representation 66C is associated with a node index for node 62D and may thereby determine that representation 66C is associated with node 62D. Thus, GPU 12 may set node 62D as the start node for traversing BVH tree 60 and may start traversal of BVH tree 60 from node 62D.

As GPU 12 traverses BVH tree 60 starting from node 62D, GPU 12 may first perform a ray-box intersection test for bounding volume 56D associated with node 62D. If GPU determines that ray 54 intersects bounded volume 56D, GPU 12 may perform a ray-primitive intersection test for primitive 52C that is linked to node 62D. If GPU determines that ray 54 does not intersect primitive 52C, GPU 12 may recursively traverse BVH tree 60 up to node 62D and may perform a ray-primitive intersection test for primitive 52D linked to node 62D. GPU 12 may determine from the ray-primitive intersection test for primitive 52D that ray 54 does intersect primitive 52D. GPU 12 may recursively traverse BVH tree 60 up to node 62C thereby ending the traversal of BVH tree 60 for ray 54. As can be seen, the traversal of BVH tree 60 to find the primitive that intersects ray 54 may include performing relatively fewer ray-box intersection tests as opposed to if GPU 12 is required to traverse BVH tree 60 starting from the root node.

In some examples, depending on the viewing angle, representations of bounding volumes of any two nodes may overlap when projected on screen. In this case the traversal of BVH tree 60 may start from the lowest common ancestor of the two overlapping bounding volumes. If two representations of bounding volumes overlap, and if a ray intersects in the overlapped region of the two bounding volumes, GPU 12 may determine the lowest common ancestor node of the nodes associated with the bounding volumes and may start traversal of BVH tree 60 from the lowest common ancestor node of the nodes associated with the bounding volumes represented by the two overlapping representations. For example, while rasterizing representations 66 to render target 64, GPU 12 may determine that representation 66C and representation 66D overlap in area 69. GPU 12 may determine the output color associated with the lowest common ancestor node of nodes 62D and 62E and may set the output color of the pixels in area 69 (i.e., fill area 69) to the same output color associated with the lowest common ancestor node of nodes 62D and 62E. In this example, GPU 12 may determine that node 62C is the lowest common ancestor node of nodes 62D and 62E and may set the output color of the pixels in area 69 to the output color of representation 66B that is associated with node 62C.

For example, if ray 68 emanating from source 55 intersects area 69, GPU 12 may determine to start traversal from the node 62C. Because node 62C is associated with bounding volume 56C represented by representation 66B in render target 64, GPU 12 may perform a ray-box intersection test for bounding volume 56C associated with node 62C. If GPU 12 determines that ray 68 intersects bounded volume 56C, GPU 12 may traverse BVH tree 60 to node 62D. GPU 12 may perform a ray-box intersection test for bounding volume 56D associated with node 62D. If GPU determines that ray 54 intersects bounded volume 56D, GPU 12 may perform a ray-primitive intersection test for primitive 52C linked to node 62D. If GPU determines that ray 54 does not intersect primitive 52C, GPU 12 may recursively traverse BVH tree 60 up to node 62D and may perform a ray-primitive intersection test for primitive 52D linked to node 62D. GPU 12 may determine from the ray-primitive intersection test for primitive 52D that ray 54 does intersect primitive 52D. However, GPU 12 may continue to recursively traverse BVH tree 60 up to node 62C and down to node 62E, and may perform a ray-box intersection test for bounding volume 56E associated with node 62E. GPU 12 may determine that ray 54 does not intersect bounding volume 56E, thereby ending the traversal of BVH tree 60 for ray 54.

Figure 7:
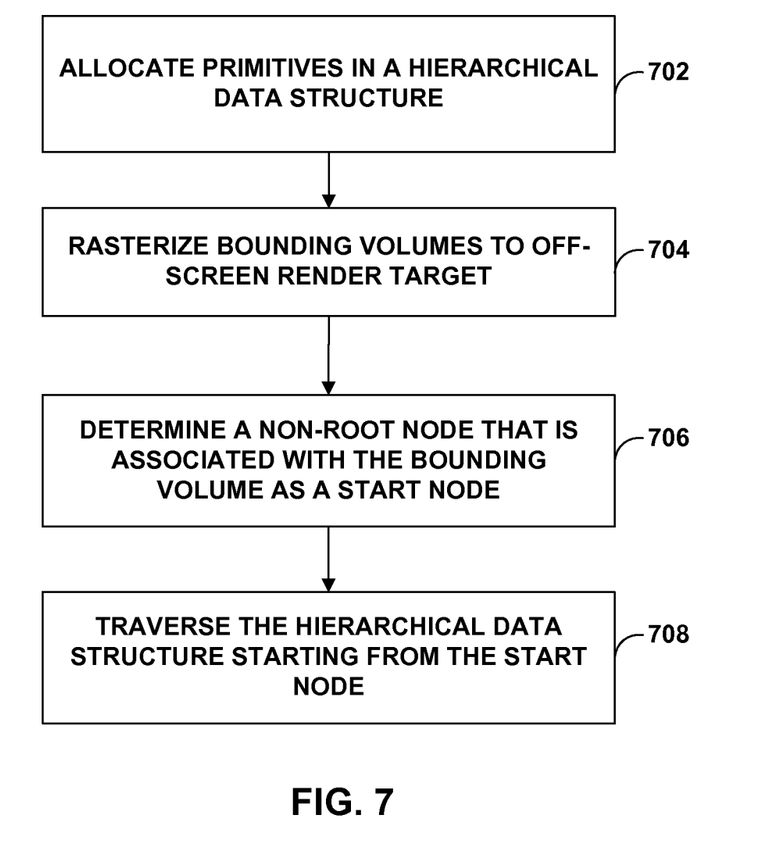
FIG. 7 is a flowchart illustrating an example process for determining the start node for traversing an example hierarchical tree structure to find a ray-primitive intersection

FIG. 7 is a flowchart illustrating an example process for determining the start node for traversing an example hierarchical tree structure to find a ray-primitive intersection. As shown in FIG. 7, the process may include organizing, by at least one processor, such as CPU 6 or GPU 12, a plurality of primitives in a hierarchical data structure (702). The process may further include rasterizing, by CPU 6 or GPU 12, a plurality of bounding volumes associated with non-root nodes of the hierarchical data structure to an off-screen render target (704). The process may further include determining, by CPU 6 or GPU 12 and based on rasterizing the plurality of bounding volumes to the off-screen render target, a non-root node of the hierarchical data structure as a start node in the hierarchical data structure to start traversal of the hierarchical data structure (706). The process may further include traversing, by CPU 6 or GPU 12, the hierarchical data structure starting from the start node to determine the primitive that is intersected by a ray (718).

In some examples, the process may further include rasterizing, by GPU 12, a plurality of representations of the plurality of bounding volumes to the off-screen render target. The process may further include determining, by CPU 6 or GPU 12, a node associated with a representation of the plurality of representations of the plurality of bounding volumes based at least in part on an output color of the representation. The process may further include determining, by CPU 6 or GPU 12, that one or more pixels in one or more of the plurality of representations is mapped to the ray and determining, by CPU 6 or GPU 12, a node of the hierarchical data structure associated with the one or more pixels as the start node.

In some examples, the process may further include determining, by CPU 6 or GPU 12, that two or more representations of the plurality of representations overlap, filling, by GPU 12, a region of overlap of the two or more representations with the output color of a lowest common ancestor representation, and determining, by CPU 6 or GPU 12, a node of the hierarchical data structure that is associated with the output color of the lowest common ancestor as the start node. In some examples, the process may further include rasterizing, by GPU 12, the plurality of representations of the plurality of bounding volumes to the off-screen render target at a relatively lower resolution than the plurality of bounding volumes.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and "processing unit," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention clamed is:

1. A method comprising:
    organizing, by at least one processor, a plurality of bounding volumes in a hierarchical data structure;
    rasterizing, by the at least one processor, representations of the plurality of bounding volumes associated with non-root nodes of the hierarchical data structure as pixels to an off-screen render target;
    determining, by the at least one processor and based at least in part on sampling a color value of one of the pixels rasterized to the off-screen render target that is mapped to a ray, a non-root node of the hierarchical data structure as a start node in the hierarchical data structure to start traversal of the hierarchical data structure; and
    traversing, by the at least one processor, the hierarchical data structure starting from the start node to determine whether the ray intersects a primitive bounded by one of the plurality of bounding volumes.

2. The method of claim 1, further comprising:
    determining, by the at least one processor, a node of the hierarchical data structure associated with the one of the pixels as the start node.

3. The method of claim 1, further comprising:
    determining, by the at least one processor, that two or more of the representations of the plurality of bounding volumes overlap;
    filling, by the at least one processor, a region of overlap of the two or more of the representations of the plurality of bounding volumes with a color value of a lowest common ancestor representation; and
    determining, by the at least one processor, a node of the hierarchical data structure that is associated with the color value of the lowest common ancestor representation as the start node.

4. The method of claim 1, further comprising:
    rasterizing, by the at least one processor, the representations of the plurality of bounding volumes to the off-screen render target at a relatively lower resolution than the plurality of bounding volumes.

5. The method of claim 1, wherein:
    the plurality of bounding volumes are associated with fewer than all of the non-root nodes of the hierarchical data structure.

6. The method of claim 1, wherein the representations of the plurality of bounding volumes associated with non-root nodes of the hierarchical data structure do not include representations of primitives bound by the plurality of bounding volumes.

7. An apparatus configured to process graphics data comprising:
    a memory configured to store a plurality of bounding volumes organized in a hierarchical data structure;
    at least one processor configured to:
        rasterize representations of the plurality of bounding volumes associated with non-root nodes of the hierarchical data structure as pixels to an off-screen render target;
        determine, based at least in part on sampling a color value of one of the pixels rasterized to the off-screen render target that is mapped to a ray, a non-root node of the hierarchical data structure as a start node in the hierarchical data structure to start traversal of the hierarchical data structure; and
        traverse the hierarchical data structure starting from the start node to determine whether the ray intersects a primitive bounded by one of the plurality of bounding volumes.

8. The apparatus of claim 7, wherein the at least one processor is further configured to:
    determine a node of the hierarchical data structure associated with the one of the pixels as the start node.

9. The apparatus of claim 7, wherein the at least one processor is further configured to:
    determine that two or more of the representations of the plurality of bounding volumes overlap;
    fill a region of overlap of the two or more of the representations of the plurality of bounding volumes with a color value of a lowest common ancestor representation; and
    determine a node of the hierarchical data structure that is associated with the color value of the lowest common ancestor representation as the start node.

10. The apparatus of claim 7, wherein the at least one processor is further configured to:
    rasterize the representations of the plurality of bounding volumes to the off-screen render target at a relatively lower resolution than the plurality of bounding volumes.

11. The apparatus of claim 7, wherein
    the plurality of bounding volumes are associated with fewer than all of the non-root nodes of the hierarchical data structure.

12. An apparatus comprising:
    means for organizing a plurality of bounding volumes in a hierarchical data structure;

means for rasterizing representations of the plurality of bounding volumes associated with non-root nodes of the hierarchical data structure as pixels to an off-screen render target;

means for determining, based at least in part on sampling a color value of one of the pixels rasterized to the off-screen render target that is mapped to a ray, a non-root node of the hierarchical data structure as a start node in the hierarchical data structure to start traversal of the hierarchical data structure; and means for traversing the hierarchical data structure starting from the start node to determine whether the ray intersects a primitive bounded by one of the plurality of bounding volumes.

13. The apparatus of claim 12, further comprising:

means for determining a node of the hierarchical data structure associated with the one of the pixels as the start node.

14. The apparatus of claim 12, further comprising:

means for determining that two or more of the representations of the plurality of bounding volumes overlap;

means for filling a region of overlap of the two or more of the representations of the plurality of bounding volumes with a color value of a lowest common ancestor representation; and means for determining a node of the hierarchical data structure that is associated with the color value of the lowest common ancestor representation as the start node.

15. The apparatus of claim 12, further comprising:

means for rasterizing the representations of the plurality of bounding volumes to the off-screen render target at a relatively lower resolution than the plurality of bounding volumes.

16. The apparatus of claim 12, wherein the plurality of bounding volumes are associated with fewer than all of the non-root nodes of the hierarchical data structure.

17. A non-transitory computer-readable storage medium storing instructions that, when executed, cause one or more programmable processors to:

organize, by at least one processor, a plurality of bounding volumes in a hierarchical data structure;

rasterize, by the at least one processor, representations of the plurality of bounding volumes associated with non-root nodes of the hierarchical data structure as pixels to an off-screen render target;

determine, by the at least one processor and based at least in part on sampling a color value of one of the pixels rasterized to the off-screen render target that is mapped to a ray, a non-root node of the hierarchical data structure as a start node in the hierarchical data structure to start traversal of the hierarchical data structure; and traverse, by the at least one processor, the hierarchical data structure starting from the start node to determine whether the ray intersects a primitive bounded by one of the plurality of bounding volumes.

18. The computer-readable storage medium of claim 17, further comprising instructions that, when executed, cause one or more programmable processors to:

determine a node of the hierarchical data structure associated with the one of the pixels as the start node.

19. The non-transitory computer-readable storage medium of claim 17, further comprising instructions that, when executed, cause one or more programmable processors to:

determine that two or more of the representations of the plurality of bounding volumes overlap;

fill a region of overlap of the two or more of the representations of the plurality of bounding volumes with a color value of a lowest common ancestor representation; and determine a node of the hierarchical data structure that is associated with the color value of the lowest common ancestor representation as the start node.

20. The non-transitory computer-readable storage medium of claim 17, further comprising instructions that, when executed, cause one or more programmable processors to:

rasterize the representations of the plurality of bounding volumes to the off-screen render target at a relatively lower resolution than the plurality of bounding volumes.

21. The non-transitory computer-readable storage medium of claim 17, wherein the plurality of bounding volumes are associated with fewer than all of the non-root nodes of the hierarchical data structure.

* * * * *